United States Patent
Wu et al.

(10) Patent No.: US 7,295,274 B1
(45) Date of Patent: Nov. 13, 2007

(54) FLOWER-SHAPED VERTICAL ALIGNMENT LIQUID CRYSTAL DISPLAYS WITH WIDE VIEW ANGLE AND FAST RESPONSE TIME

(75) Inventors: Shin-Tson Wu, Oviedo, FL (US); Ruibo Lu, Orlando, FL (US); Qi Hong, Orlando, FL (US); Thomas X. Wu, Orlando, FL (US)

(73) Assignees: University of Central Florida Research Foundation, Inc., Orlando, FL (US); AU Optronics Corp., Hsinchu (TW)

( * ) Notice: Subject to any disclaimer, the term of this patent is extended or adjusted under 35 U.S.C. 154(b) by 65 days.

(21) Appl. No.: 10/786,282

(22) Filed: Feb. 24, 2004

Related U.S. Application Data

(60) Provisional application No. 60/459,451, filed on Apr. 1, 2003.

(51) Int. Cl.
  *G02F 1/1337* (2006.01)
  *G02F 1/1343* (2006.01)
(52) U.S. Cl. ............ 349/130; 349/128; 349/139
(58) Field of Classification Search ............ 349/128, 349/129, 130, 141
  See application file for complete search history.

(56) References Cited

U.S. PATENT DOCUMENTS 5,666,179 A * 9/1997 Koma ............ 349/143
5,969,781 A * 10/1999 Matsuyama et al. ........ 349/130
6,014,188 A   1/2000 Yamada et al. ............ 349/32
6,400,433 B1 * 6/2002 Arakawa et al. ............ 349/117

(Continued)

OTHER PUBLICATIONS

"Transverse field effects in nematic liquid crystals," R. A. Soref, Appl. Phys. Lett., vol. 22, No. 4, Feb. 15, 1973, pp. 165-166.

(Continued)

*Primary Examiner*—Andrew Schechter
*Assistant Examiner*—Michael H. Caley
(74) *Attorney, Agent, or Firm*—Brian S. Steinberger; Phyllis K. Wood; Law Offices of Brian S. Steinberger, P.A.

(57) ABSTRACT

A novel vertical alignment liquid crystal display with a structure having a flower-shaped vertical alignment (FVA) has the properties of fast response, high contrast ratio and a wide view angle. The method for making the device and structure of the FVA comprises the arrangement of: a first substrate with a protrusion shaped electrode as the pixel electrode; and a second substrate as the common electrode; aligning layers formed on said first and second substrates providing liquid crystal vertical alignment; liquid crystal materials filling a space between said first and second substrates as a liquid crystal cell; a linear polarizer and wide band quarter-wave film forming a circular polarizer; and, said circular polarizer disposed on exterior surfaces of said liquid crystal cell. When voltage is applied to the device, the liquid crystal (LC) director distribution looks like a flower blossom.

23 Claims, 13 Drawing Sheets

U.S. PATENT DOCUMENTS

| | | | | |
|---|---|---|---|---|
| 6,424,398 | B1 | 7/2002 | Taniguchi | 349/143 |
| 6,426,786 | B1* | 7/2002 | Lu et al. | 349/125 |
| 6,512,564 | B1* | 1/2003 | Yoshida et al. | 349/124 |
| 6,671,025 | B1* | 12/2003 | Ikeda et al. | 349/156 |
| 6,680,769 | B1* | 1/2004 | Lee et al. | 349/129 |
| 6,850,301 | B2* | 2/2005 | Shimoshikiryo | 349/129 |
| 6,952,252 | B2* | 10/2005 | Nakanishi | 349/182 |
| 7,002,653 | B2* | 2/2006 | Taniguchi et al. | 349/138 |
| 2003/0160928 | A1* | 8/2003 | Ozawa et al. | 349/129 |

OTHER PUBLICATIONS

"*Field effects in nematic liquid crystals obtained with interdigital electrodes,*" R. A. Soref, Journal of Applied Physics, vol. 45, No. 12, Dec. 1974, pp. 5466-5468.

"*P2-30 In-Plane Switching of Nematic Liquid Crystals,*" R. Kiefer, et al., Japan Display '92, pp. 547-550.

"*LP-7: Late-News Poster: Axially Symmetric Aligned Microcell (ACM) Mode: Electro-Optical Characteristics of New Display Mode with Excellent Wide Viewing Angle,*" N. Yamada, et al., SID 95 DIGEST, pp. 575-578.

"*41.1: A Super-High Image Quality Multi-Domain Vertical Alignment LCD by New Rubbing-Less Technology*" A. Takeda, et al., SID vol. 29 (1998), p. 1077.

"*41.4: Advanced ASM Mode (Axially Symmetric Aligned Microcell Mode): Improvement of Display Performances by Using Negative Dielectric Liquid Crystal,*" Y. Kume, et al., SID vol. 29 (1998) p. 1089.

"*Super High Quality MVA-TFT Liquid Crystal Displays,*" Yoshio Koike, et al., FUJITSU Sci. Tech. J., 35, 2, pp. 221-228 (Dec. 1999).

\* cited by examiner

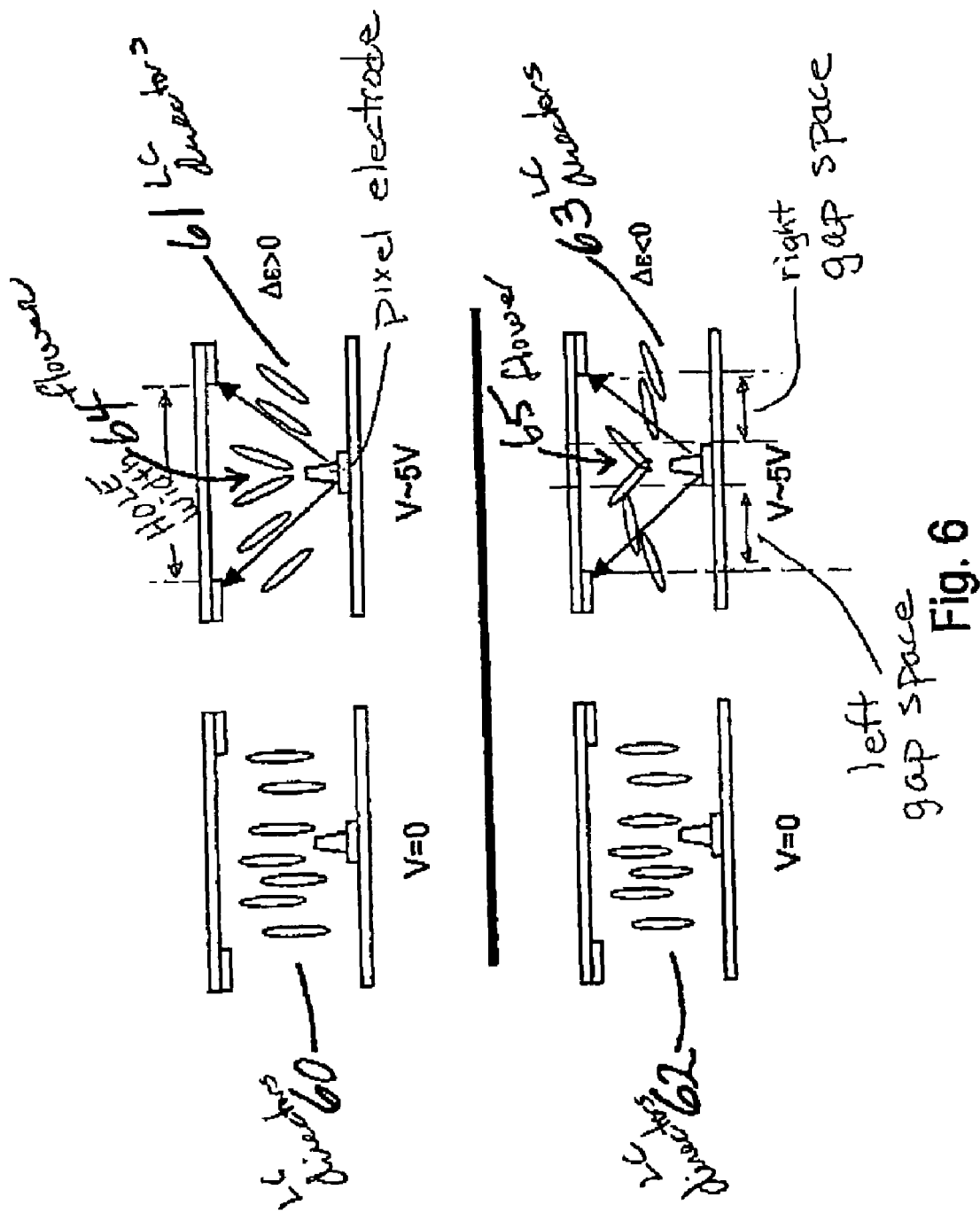

FLOWER-SHAPED VERTICAL ALIGNMENT LIQUID CRYSTAL DISPLAYS WITH WIDE VIEW ANGLE AND FAST RESPONSE TIME

This invention claims the benefit of priority based on U.S. Provisional patent application 60/459,451 filed Apr. 1, 2003.

FIELD OF THE INVENTION

This invention relates to a novel structure of vertical alignment (VA) liquid crystal displays (LCD), and more specifically, to a structure of a liquid crystal display (LCD) with flower-shaped vertical alignment (FVA) with fast response, high contrast ratio, wide view angle and method for making the FVA device.

BACKGROUND AND PRIOR ART

With the quick development and expansion of the liquid crystal display market, fast response, high contrast ratio and wide view angle are the main issues to improve the display quality. Fast response, high contrast ratio and wide view angle are critically required in large size monitors and television (TV) applications. At present, in-plane switching (IPS), multi-domain vertical alignment (MVA) and axially symmetric-aligned microcell (ASM) are the typical candidates for obtaining the high display quality in these areas.

The IPS concept was first published by R. A. Soref in *Applied Physics Letters,* vol. 22, p. 165 (1973) and *Journal of Applied Physics* vol. 45, p. 5466 (1974). In 1992, Kiefer et al in *Japan Display '92* p. 547, extended the IPS operating principle to display devices. The IPS liquid crystal display (LCD) works as the electric field is applied in the transversal direction and the liquid crystal (LC) molecules are rotated in the same plane as shown in FIG. 1 of this application. The IPS structure in FIG. 1 comprises an analyzer layer 10, a liquid crystal layer 11 sandwiched between a top substrate 12 and a bottom substrate 13 positioned above a polarizer 14 through which a backlight 15 is directed. The rubbing direction is indicated by arrows 16 and 17. As a result, the IPS mode exhibits a wide viewing angle and high contrast ratio, while the response time is relatively slow at approximately 50 milliseconds (ms).

As shown in FIG. 2, Fujitsu Ltd. invented a super high quality MVA LCD published in *SID Technical Digest,* vol. 29, p. 1077 (1998), *Fujitsu Science Technical Journal,* vol. 35, p. 221 (1999), and typically as disclosed in U.S. Pat. No. 6,424,398 B1 in 2002. In FIG. 2, The chevron-patterned protrusions 21 and 22 are created on the upper and lower substrates to form multi-domain LCD cells in multiple independent directions. The devices provide a high contrast ratio higher than 300:1, view angle wider than 160 degrees, and a fast response of 25 ms. Since the horizontal gap between the upper and the lower protrusions must be less than 30 micrometers (μm) in order to obtain fast response time, the pixel alignment needs high precision. Thus, the design specification and preparation process are not easy and the aperture ratio is limited. In addition, the adopted LC materials are constrained to negative dielectric ones in order to realize the deformed homeotropic alignment effect in the voltage-on state.

The axially symmetric-aligned microcell (ASM) was developed by Sharp Corp. as disclosed in U.S. Pat. No. 6,014,188 in 2000 and published in the *SID Technical Digest,* vol. 26, p. 575 (1995), and *SID Technical Digest,* vol. 29, p. 1089 (1998) respectively. In the ASM mode, the liquid crystal alignment 30 shows spiral distribution and the polymer walls 31 are formed by ultra-violet (UV) exposure to construct microcell pixels 32 as shown in FIG. 3 of this application. The view angle of more than 120 degrees, high contrast ratio of 300:1 and a medium response time of 30 ms can be obtained in the ASM mode. Since the polymer network stabilizes the LC alignment in the microcells, the large-scaled precise control of the microcells and the long-term stability of them are the questionable problems for this mode.

In the above-mentioned modes, two linear polarizers are usually used. Recently, Iwamoto et al reported a MVA mode using circular polarizers in the $9^{th}$ *International Display Workshops,* p. 85 (Hiroshima, Japan, Dec. 4–6, 2002). The light efficiency is improved. In the IPS mode, a rubbing process is necessary in order to achieve uniform LC alignment. The problems associated with the rubbing process are thin film transistor (TFT) damages, dust particle contamination, and static charges.

There is still a need to overcome problems with existing technology to obtain high quality displays for large monitors. As discussed above, IPS has a relatively slow response time and requires a rubbing process. MVA LCD has difficult design specifications, which results in a tedious preparation process. ASM requires precise control of the microcells and has problems with long-term stability. The present invention resolves many problems with current technology while providing a reliable, simple structure suitable for high yield mass production.

SUMMARY OF THE INVENTION

A primary objective of the invention is to provide a flower-shaped vertical alignment (FVA) mode liquid crystal display (LCD) with a protrusion structure using the circularly polarized light.

A secondary objective of the invention is to provide a FVA structure showing fast response time.

A third objective of the invention is to provide a FVA structure showing high contrast ratio.

A fourth objective of the invention is to provide a FVA structure showing wide view angle.

A fifth objective of the invention is to provide a LCD with simple structure and rubbing-free technique for high yield mass production.

A sixth objective of the invention is to provide a method for making a wide view angle, fast response, high contrast ratio liquid crystal display (LCD) with a flower-shaped vertical alignment (FVA).

According to the invention, there is provided a flower-shaped vertical alignment (FVA) structure liquid crystal display (LCD) with fast response, high contrast ratio and wide view angle comprising: a first substrate with a protrusion shaped electrode as the pixel electrode; a second substrate as the common electrode; aligning layers formed on said first and second substrates providing liquid crystal vertical alignment; liquid crystal materials filling a space between said first and second substrates as a liquid crystal cell; a linear polarizer and wide band quarter-wave film forming a circular polarizer; and, said circular polarizer disposed on exterior surfaces of said liquid crystal cell.

Further objects and advantages of this invention will be apparent from the following detailed descriptions of the presently preferred embodiments, which are illustrated schematically in the accompanying drawings.

BRIEF DESCRIPTION OF THE FIGURES

FIG. 6 shows the operation mechanisms of the novel FVA mode using positive and negative liquid crystal materials.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 4:
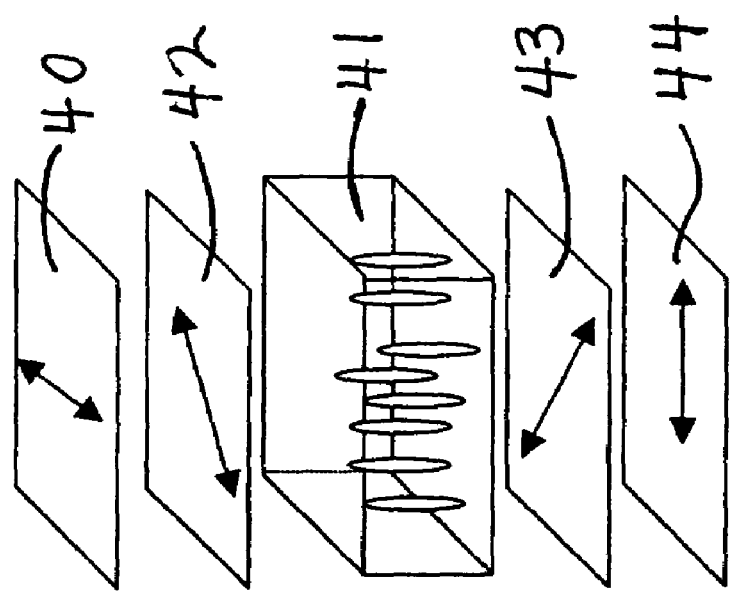
FIG. 4 shows a general device configuration of the novel FVA mode of this invention.

The invention provides a new device structure for achieving fast response time, high contrast ratio and wide view angle using the circular polarizers. It is rubbing-free and with a simple preparation process, where both positive (Δε>0) and negative (Δε<0) dielectric LC materials can be used. FIG. 4 shows a typical proposed device configuration comprising, a first polarizer layer 40 at approximately 90°, a vertically aligned liquid crystal 41, sandwiched between a wide-band quarter-wave film 42 at approximately 45° and a wide-band quarter-wave film 43 at approximately 135°, and a second polarizer layer 44 at approximately 0°. Two broadband quarter-wave films are placed before and after the crossed linear polarizers. The principal axis of the first linear polarizer and the first broadband quarter-wave film is arranged at approximately 45° to form the front circular polarizer. It has a left-hand circularity. Similarly, the principal axis of second linear polarizer and the second broadband quarter-wave film is arranged at approximately 45° to form the rear circular polarizer with the right-hand circularity. The LC molecules are homeotropically aligned without a rubbing process and the cell is in the vertical alignment (VA) mode at null voltage state.

Figures 1, 2:
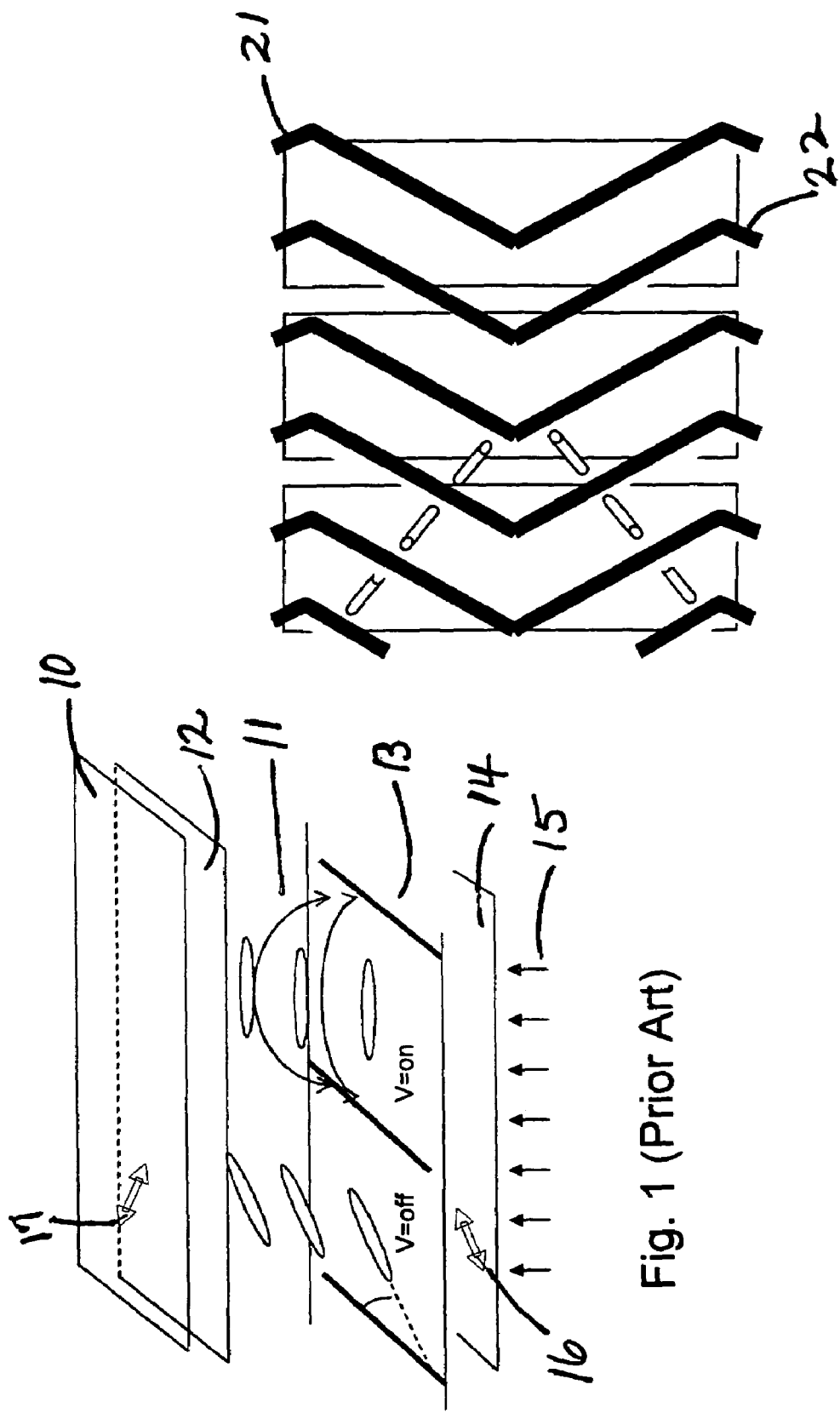
FIG. 1 shows a general structure of in plane switching (prior art).
FIG. 2 shows a general structure of MVA developed by Fujitsu Ltd (prior art).
Figure 3:
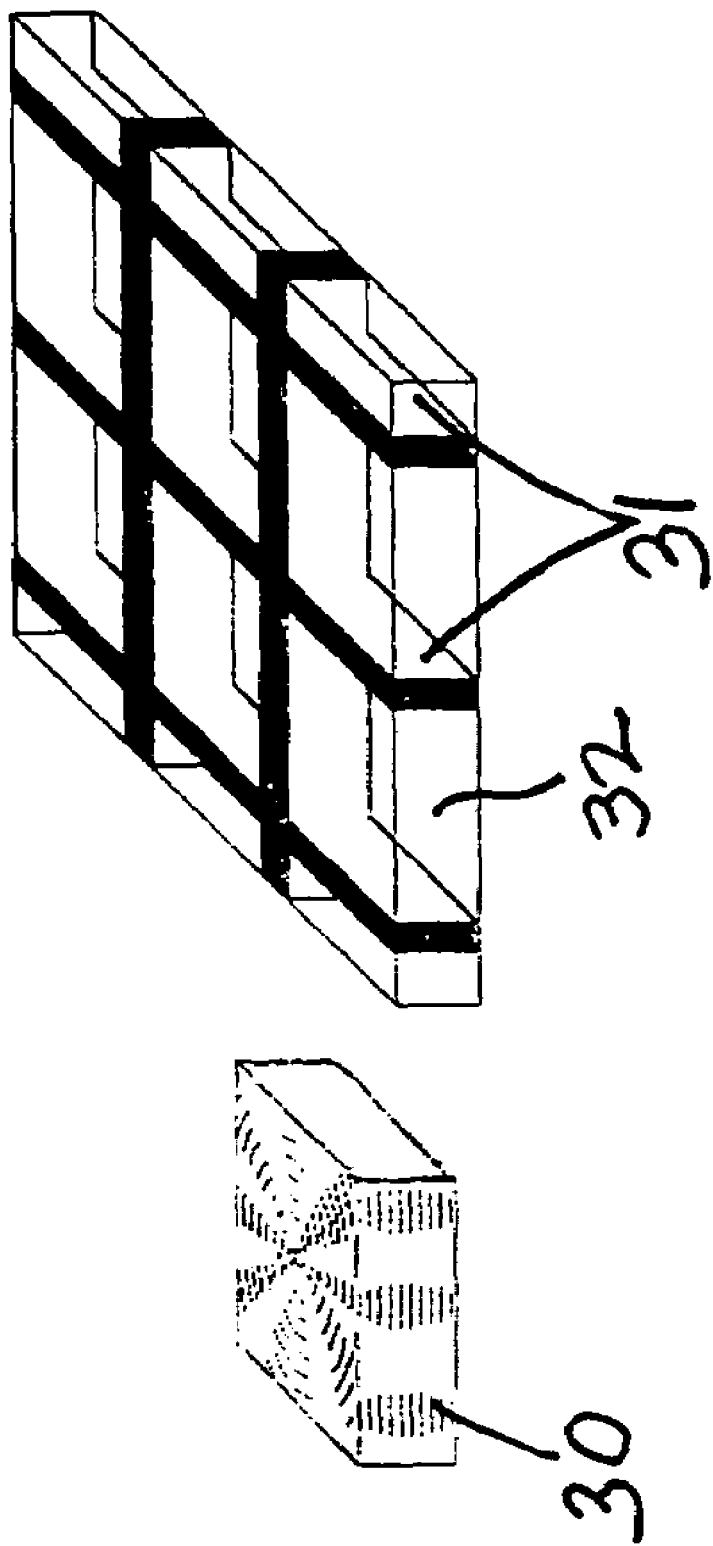
FIG. 3 shows a general structure of ASM developed by Sharp Corp (prior art).
Figure 5:
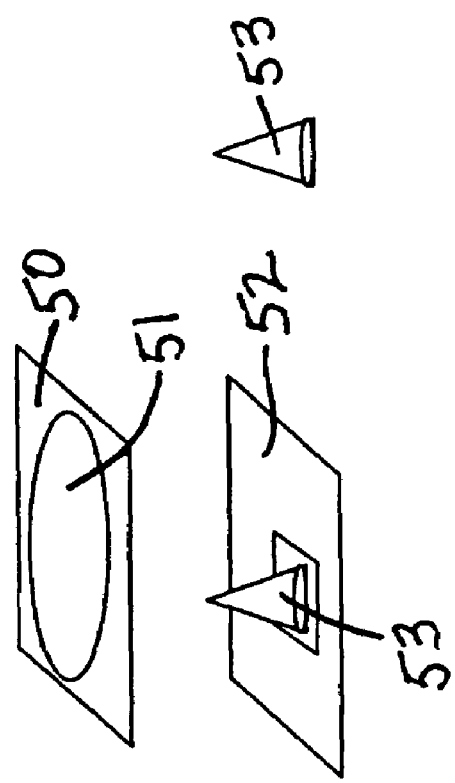
FIG. 5 shows a typical pixel configuration of the novel FVA mode of this invention.

The typical pixel configuration is indicated in FIG. 5 wherein, the top indium tin oxide (ITO) substrate 50 has an empty hole 51 and the bottom ITO substrate 52 has protrusions 53 in the form of wall-bumps. The empty hole 51 in the ITO layer can have various shapes, such as circular, elliptical, ring-shaped, square, rectangular and hexagonal. To improve the filling factor, the ring-shaped ITO can be changed to a hexagon. The ring-shaped ITO is used as an example for calculations. When there is no voltage applied, the incident light is completely blocked by the crossed circular polarizers and an excellent dark state is obtained. When the voltage is applied, the fringing electric fields surrounding the top ring ITO and bottom protrusion are created. The bottom protrusion electrode may have a variety of shapes including, but not limited to, conical, spherical, semi-spherical tower, pyramid and column-like structures.

Referring now to FIG. 6, the LC directors 60 and 61 are between a top substrate, as identified in FIG. 5 as 50 and a bottom substrate 53, with ΔE>0 reoriented along the electric field direction, and the LC directors 62 and 63 are between the same top and bottom substrate, as described in FIG. 5, with ΔE<0 reoriented perpendicular to the electric field direction. Therefore, light transmits the crossed circular polarizers. A contrast ratio >500:1 can be achieved relatively easily. The LC director distribution looks like a flower blossom 64 and 65 in this electric field ON state when observed in the cell normal direction. This is why this operation mode is named as the flower vertical alignment (FVA) mode.

For explanation and comparison purposes, the following two embodiments using Δε>0 and Δε<0 LC materials, respectively, are described.

Embodiment 1: Positive (Δε>0) Dielectric Anisotropy

The LC device structures of the present invention are shown in FIGS. 4, 5 and 6. In FIG. 5, the diameter of the ring-shaped hole 51 on the top substrate 50 is approximately 8 micrometers (µm). A conic ITO protrusion 53 on the bottom substrate is approximately 1.5 µm in height. The cell gap between the top and bottom substrates is approximately 4 µm. A positive Δε LC material, E7 from Merck Company has the properties: birefringence Δn=0.215, dielectric anisotropy Δε=14.3 and rotational viscosity $\gamma_1$=0.19 Pas) is aligned vertical to the substrates in the initial state. Its azimuthal angle is approximately 0.5°, and the pretilt angle is approximately 89.5°.

Figure 7:
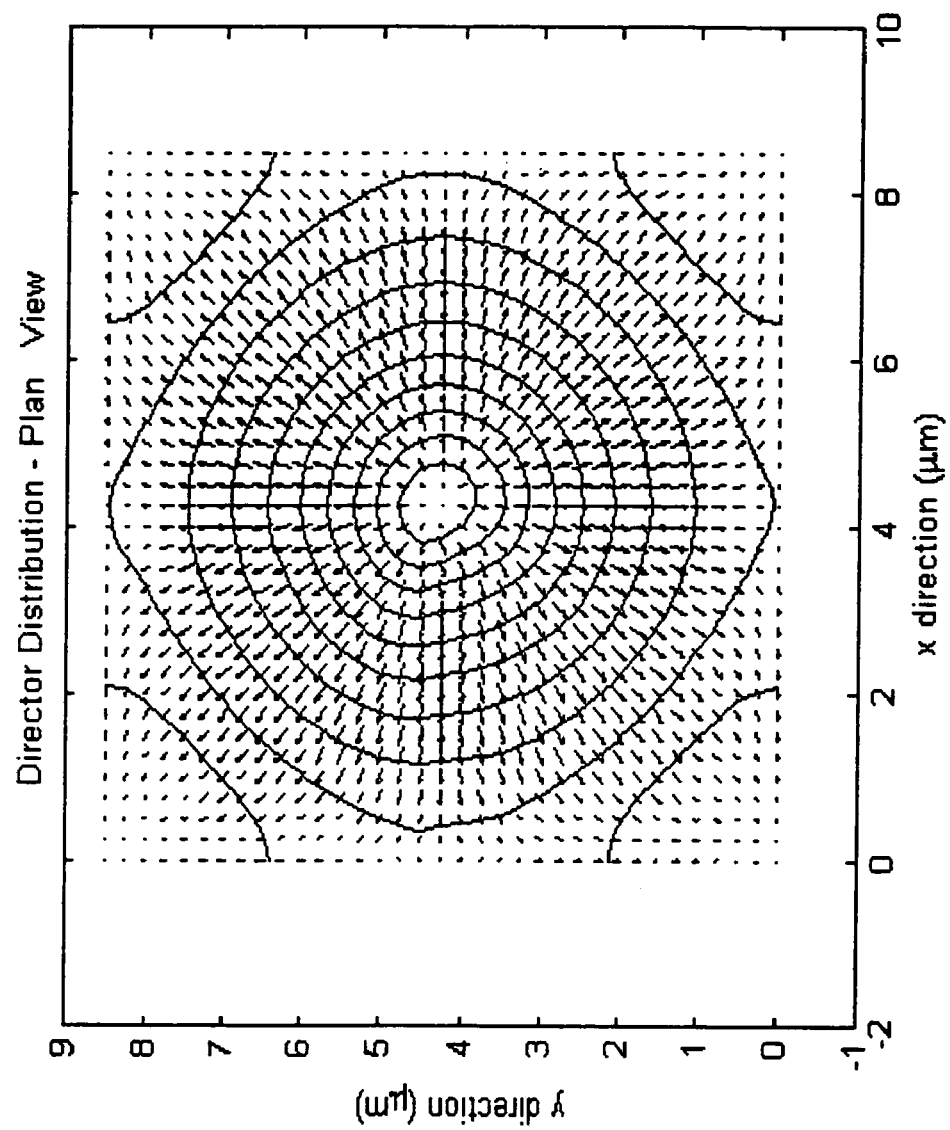
FIG. 7 shows the simulated LC director distribution of the FVA cell using a positive Merck E7 LC material as an example. The applied voltage is V=6.5 $V_{rms}$.

FIG. 7 is the simulated LC director distribution of this embodiment when the applied voltage is 6.5 $V_{rms}$. The LC directors are reoriented along the electric field direction due to the fringing field effect. From the plan view, the LC directors look like a flower blossom, forming generally expanding concentric patterns.

Figure 8:
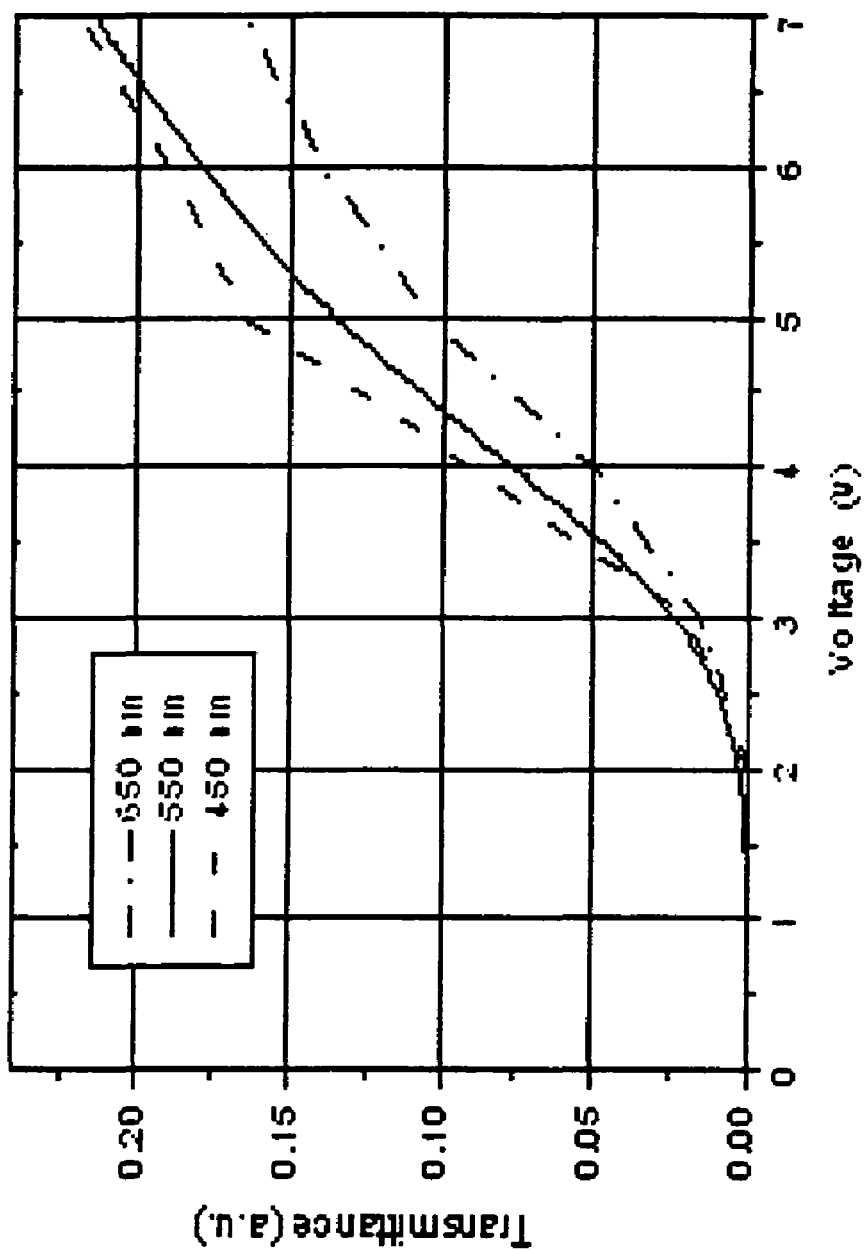
FIG. 8 shows the voltage-dependent transmittance of FVA cell using a positive Merck E7 LC material at wavelengths λ=450 nm, 550 nm and 650 nm, respectively.
Figure 9:
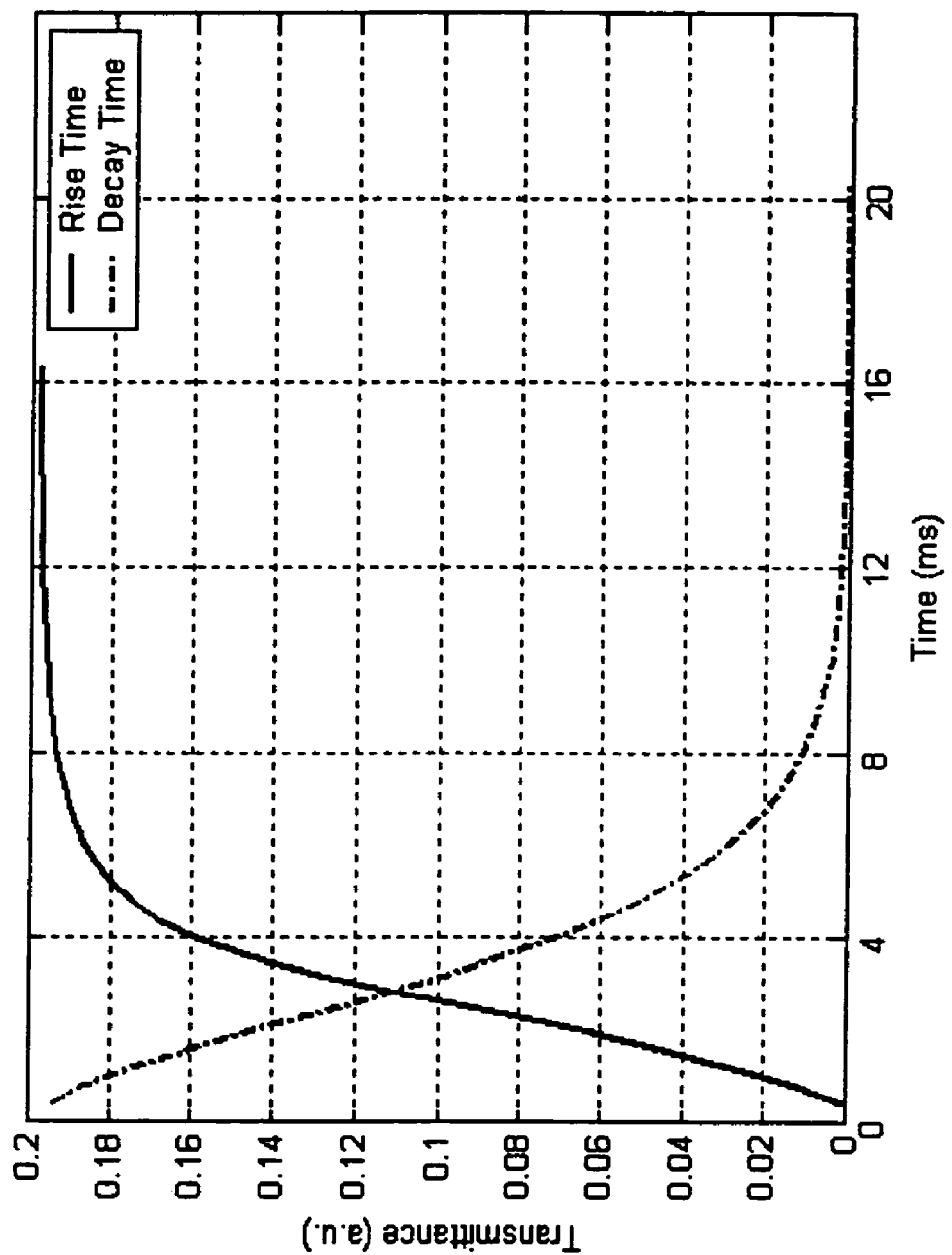
FIG. 9 shows the response time of FVA cell using a positive Merck E7 LC material at V=6.5 $V_{rms}$.

FIG. 8 shows the voltage-dependent transmittance of the device at three primary wavelengths λ=450 nm, 550 nm and 650 nm, respectively. After taking into account the optical losses of circular polarizers, the transmission is 19% at 6.5 $V_{rms}$ for the wavelength λ=550 nm. The device has a fast response time of 12 ms (rise+decay) when a 6.5 $V_{rms}$ voltage is applied to the cell. Results are shown in FIG. 9. The FVA mode also exhibits a high contrast ratio, defined as $T_{on}/T_{off}$.

Figure 10:
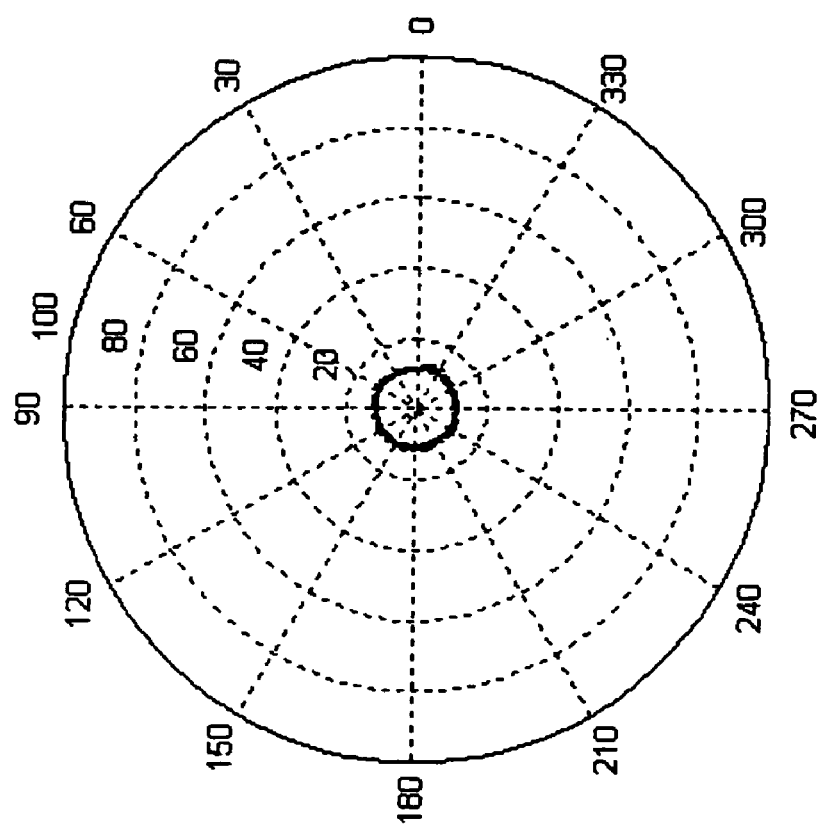
FIG. 10 shows the contrast ratio of FVA cell with Merck E7 LC material at V=6.5 $V_{rms}$. The contrast ratio is calculated along the device's normal direction without the compensation films at wavelength λ=550 nm.

From FIG. 10, the contrast ratio exceeds 500:1 at the device's normal direction. In this calculation, no compensation film is used. It is known that a uniaxial film and a negative birefringence film are needed for a VA mode to exhibit a wide viewing angle. [S. T. Wu and D. K. Yang, *Reflective Liquid Crystal Displays* (Wiley, Chichester, 2001); Chap. 12].

Figure 11:
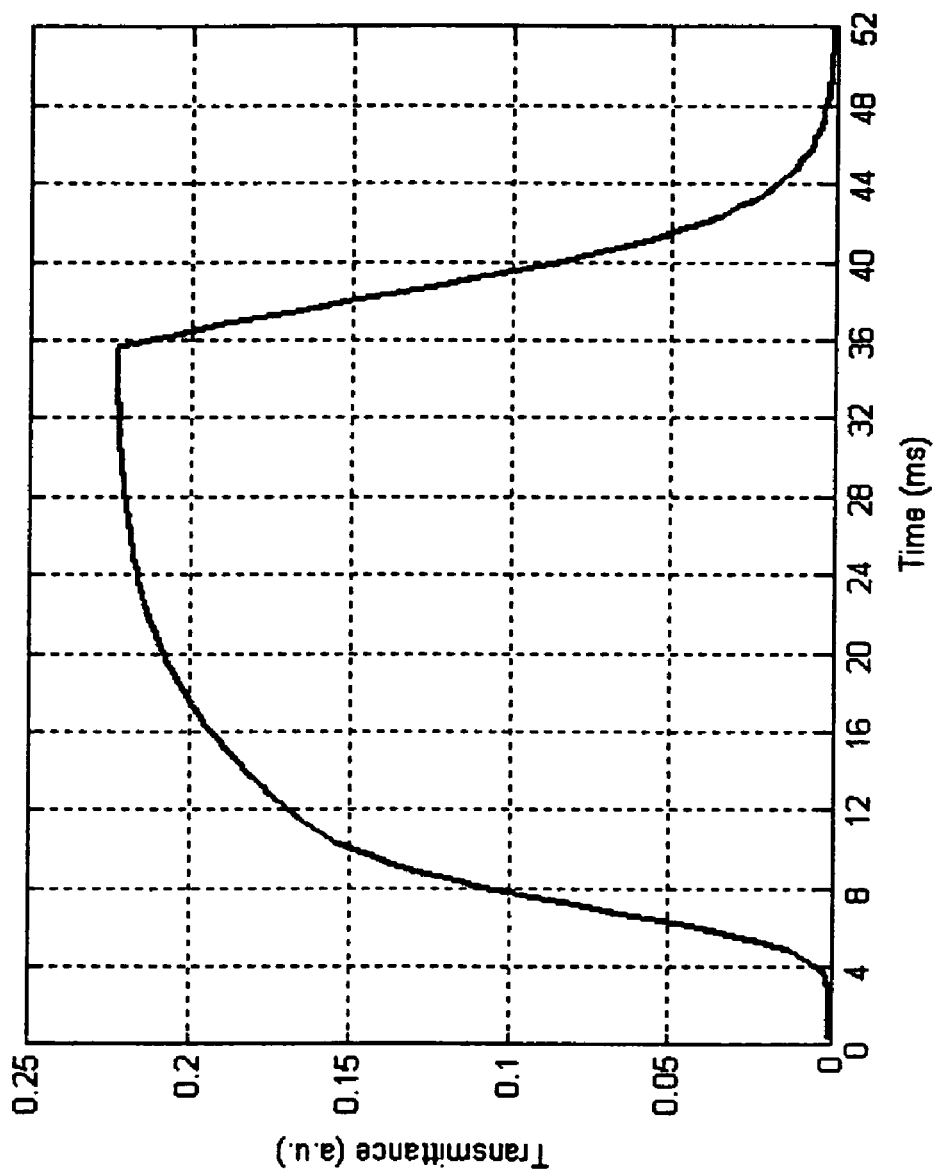
FIG. 11 shows the simulated time-dependent transmittance of Fujitsu's MVA cell using a negative Merck MLC-6609 LC mixture.

For the comparison purpose, the Fujitsu's MVA mode was chosen as the benchmark. FIG. 11 shows the transmittance of Fujitsu's MVA mode using negative LC mixture MLC-6609 (Merck Company: birefringence $\Delta n=0.0777$, dielectric anisotropy $\Delta\epsilon=-3.7$ and rotational viscosity $\gamma_1=0.16$ Pas) under the same cell conditions. The maximum transmittance of the MVA cell is 22%. Thus, our FVA mode has compatible transmission efficiency to that of Fujitsu's MVA mode. The major advantage of the novel FVA mode is in the faster response time.

The decay time of a LC cell is proportional to $\gamma_1 d^2/K\pi^2$; where d is the cell gap, $\gamma_1$ is the rotational viscosity and K is the corresponding elastic constant. For a LC, the following relationship holds: $K_{33}>K_{11}>K_{22}$. Owing to the molecular structure and shape differences, a positive $\Delta\epsilon$ liquid crystal possesses a lower rotational viscosity ($\gamma_1$) and larger bend elastic constant ($K_{33}$) than its negative $\Delta\epsilon$ counterpart. As a result, the VA using positive $\Delta\epsilon$ LC exhibits a faster response time than that of a negative $\Delta\epsilon$ LC. This explains why the novel FVA mode disclosed herein has faster response time than that of the MVA mode.

Embodiment 2: Negative ($\Delta\epsilon<0$) Dielectric Anisotropy

The LC device structures, as earlier noted, are shown in FIGS. 4, 5 and 6. The diameter of the ring-shaped hole on the top substrate is approximately 9 μm. A conic ITO protrusion is on the bottom substrate with the height of approximately 2 μm. The cell gap between the top and bottom substrates is approximately 4 μm. A negative $\Delta\epsilon$ LC mixture (MLC-6609 from Merck) is aligned vertically in the cell in the initial state. Its azimuthal angle is approximately 0.5° and the pretilt angle is approximately 89.5°.

Figure 12:
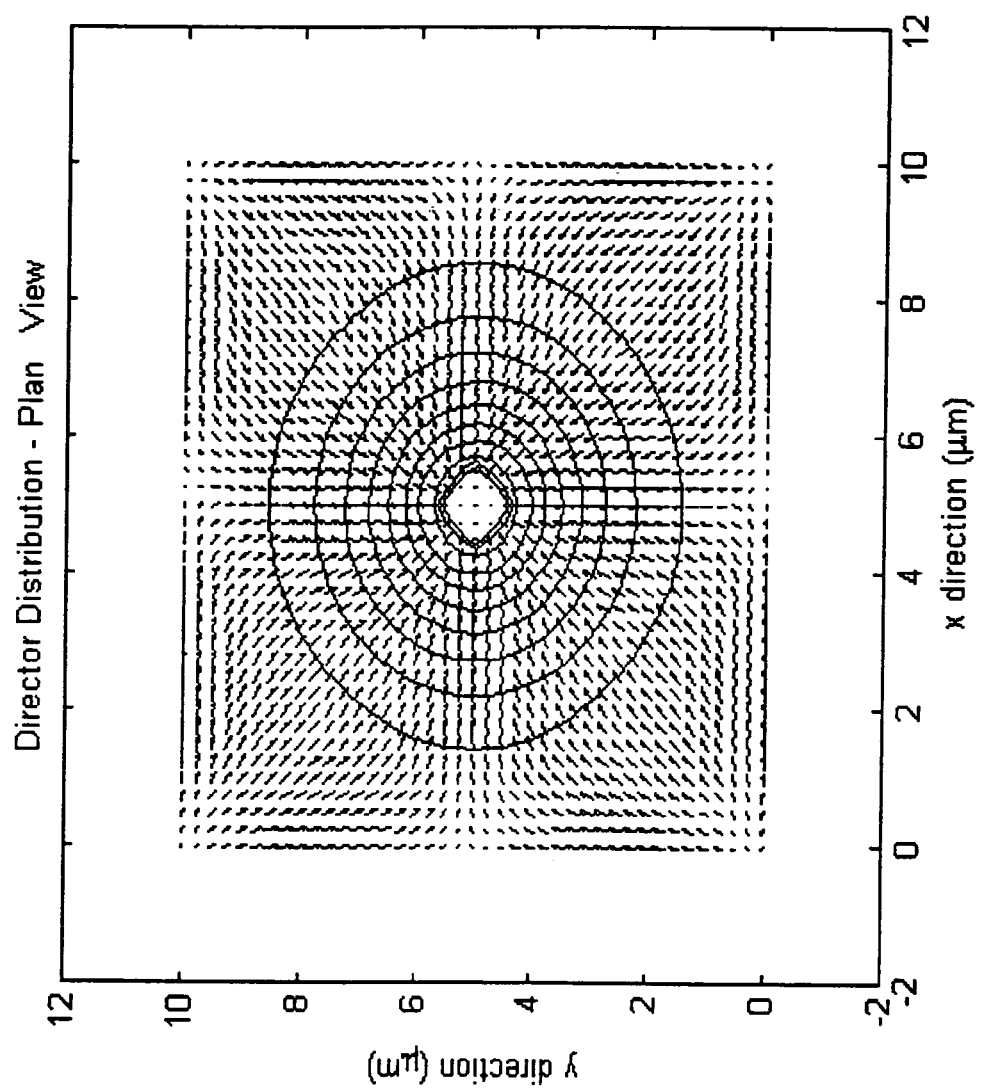
FIG. 12 shows the simulated LC director distribution of FVA cell with a negative LC mixture (Merck MLC-6609) at V=9 $V_{rms}$.

FIG. 12 shows the LC director distribution of this embodiment when the applied voltage is 9 $V_{rms}$. The LC directors are reoriented perpendicular to the electric field direction due to the fringe field effect. As in FIG. 7, the LC directors have the appearance of a flower blossom in the plan view. The flower blossom appears as generally expanding concentric patterns.

Figure 13:
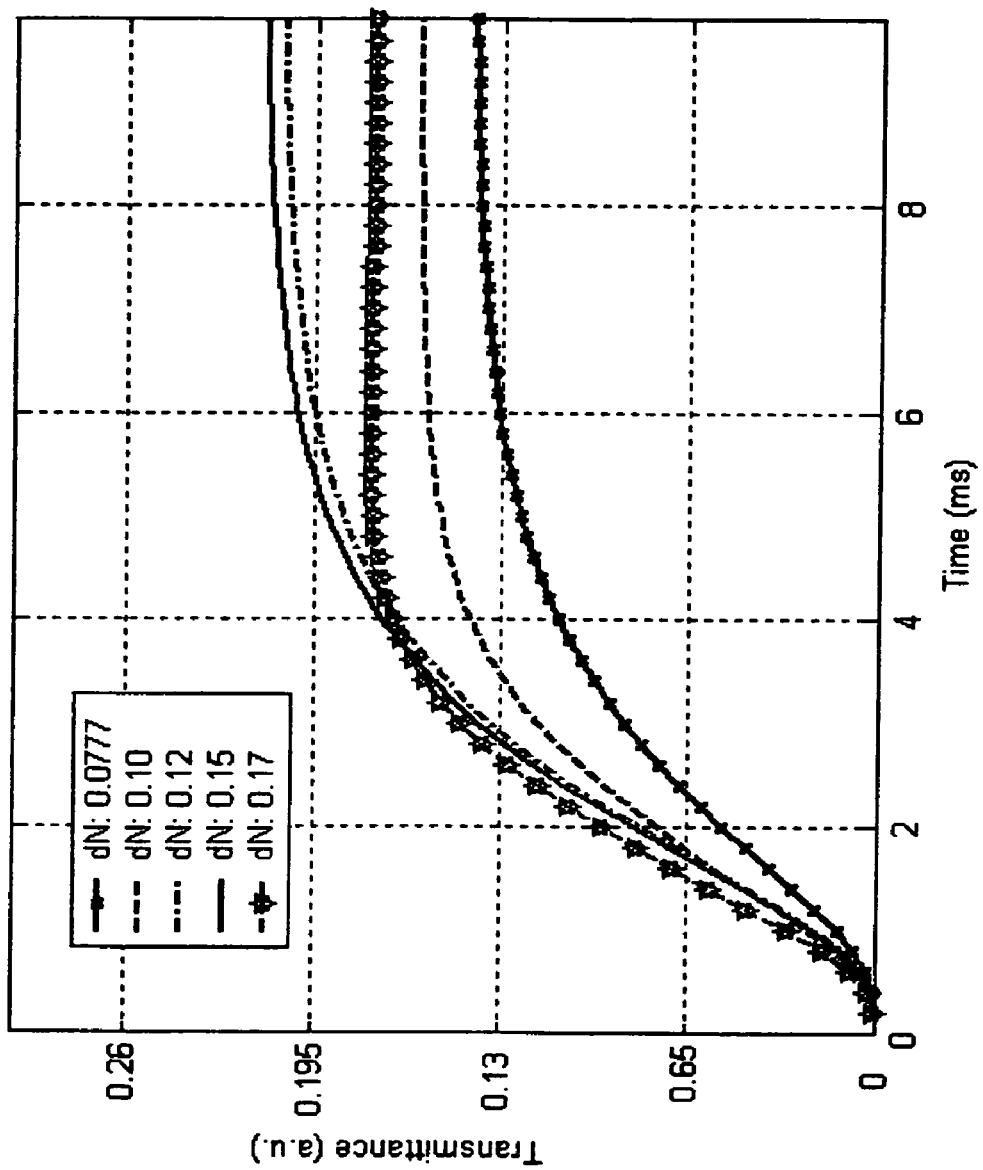
FIG. 13 shows the time-dependent transmittance of FVA cell with a negative LC mixture (Merck MLC-6609) at different Δn values. Cell gap d=4 µm, V=9 $V_{rms}$ and λ=550 nm.
Figure 14:
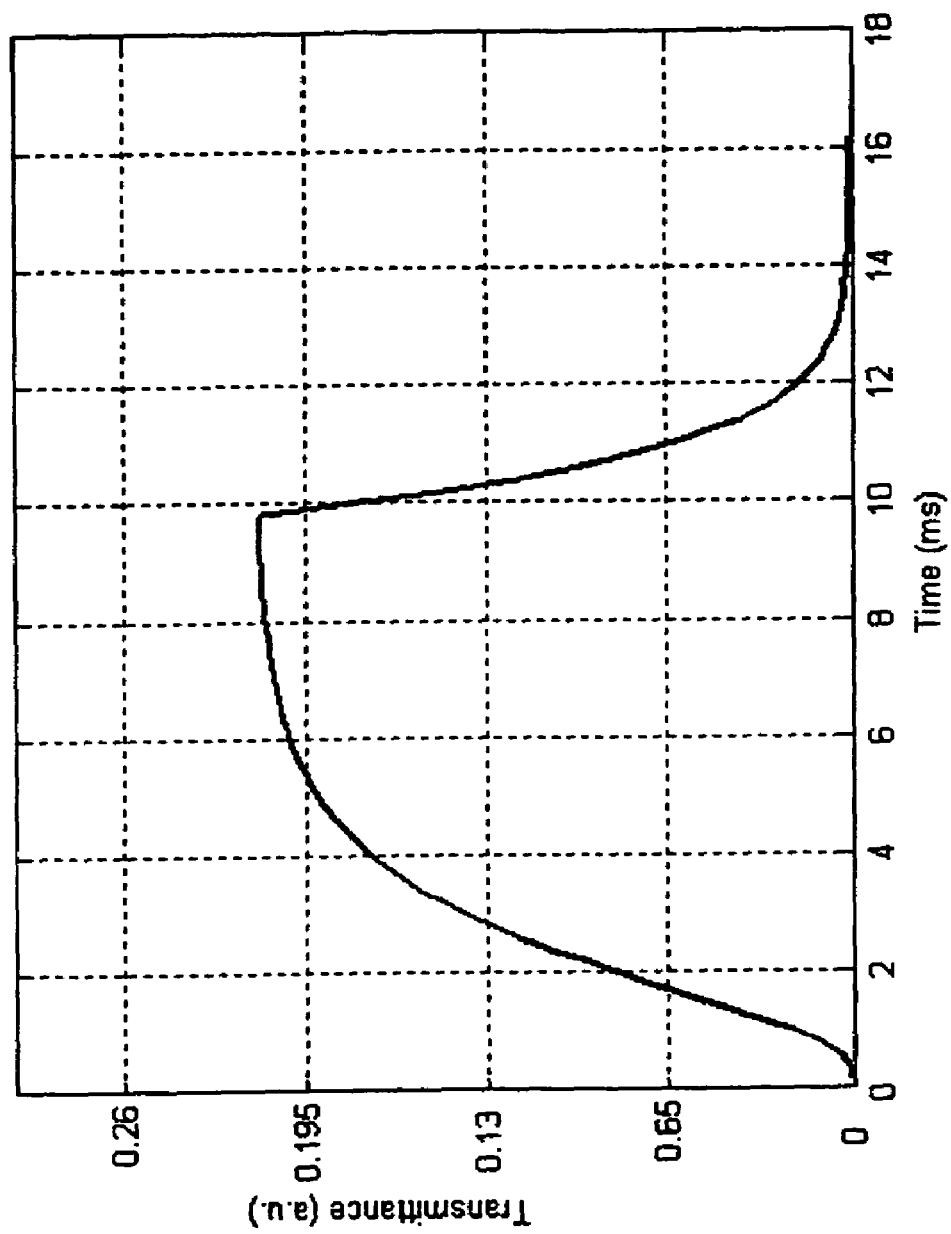
FIG. 14 shows the response time of the FVA cell with MLC-6609 LC mixture at V=9 $V_{rms}$ and Δn=0.15.
Figure 15:
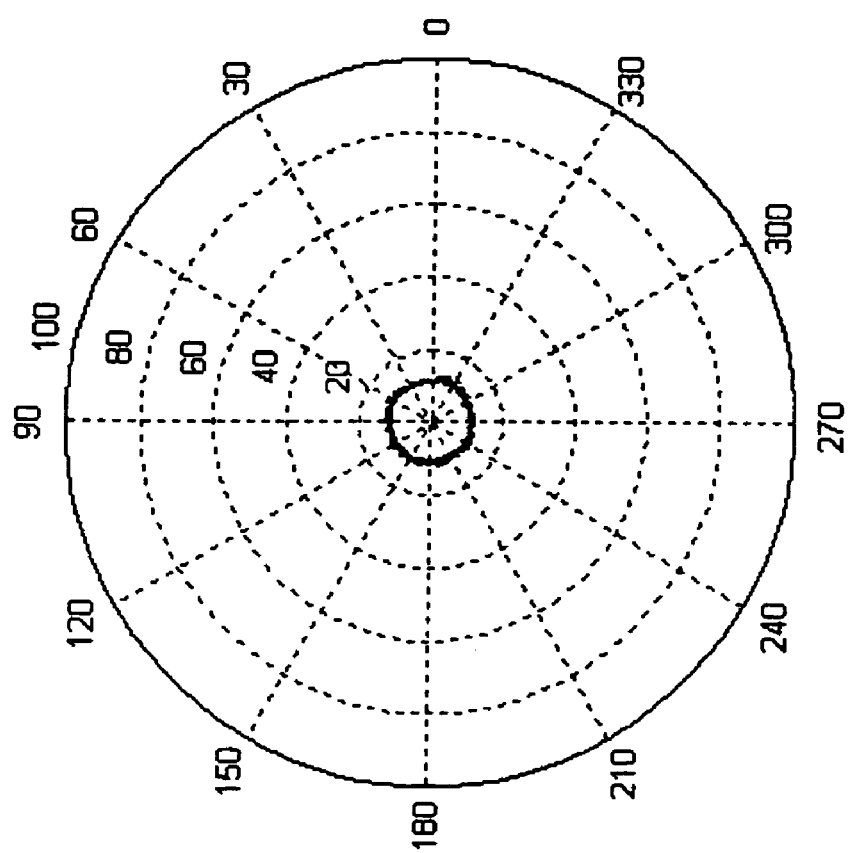
FIG. 15 shows the contrast ratio of FVA cell using a negative Δε Merck MLC-6609 LC mixture at V=9 $V_{rms}$. The contrast ratio is calculated at normal incidence and λ=550 nm. No compensation film is used for this simulation.

FIG. 13 is the time-dependent transmittance of the device at different $\Delta n$ in the rise period at $\lambda=550$ nm. The maximum transmittance reaches 21% at $\Delta n=0.15$, which is comparable to that of Fujitsu's MVA mode. As shown in FIG. 14, the device response time (rise+decay) is as short as 10 milliseconds (ms) when 9 $V_{rms}$ is applied to the cell. FIG. 15 plots the voltage-dependent transmittance of such embodiment. A contrast ratio higher than 500:1 is obtained. Therefore, the novel FVA mode of the invention is particularly suitable for liquid crystal television (LC TV) and monitor applications.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A flower-shaped vertical alignment (FVA) structure transmissive liquid crystal display with fast response, high contrast ratio and wide view angle comprising:
   (a) a first substrate with a protrusion shaped electrode as the pixel electrode on an interior surface of the first substrate;
   (b) a second substrate with a common electrode on an interior surface of the second substrate, wherein the common electrode includes an empty hole directly above the entire first protrusion shaped electrode to form a gap spacing below the hole on each side of the protrusion shaped pixel electrode between the common electrode and the protrusion shaped pixel electrode;
   (c) aligning layers formed on said first and second substrates providing liquid crystal vertical alignment;
   (d) liquid crystal materials filling a space between said first and second substrates as a liquid crystal cell;
   (d) a first linear polarizer and first wide band quarter-wave film on an exterior surface of the first substrate forming a first circular polarizer; and,
   (f) a second linear polarizer and a second wide band quarter-wave film on an exterior surface of the second substrate forming a second circular polarizer, wherein a circularly polarized light produced by said first and second circular polarizers is used as a light source so that the liquid crystal display operates in a transmissive mode to form the flower-shaped vertical alignment.

2. The FVA structure liquid crystal display of claim 1 wherein the common electrode empty hole is a hexagon-shaped hole.

3. The FVA structure liquid crystal display of claim 1 wherein the aligning layer is a polymer.

4. The FVA structure liquid crystal display of claim 1 wherein the aligning layer is an inorganic material.

5. The FVA structure liquid crystal display of claim 1 wherein the pixel electrode has a shape selected from at least one of: conic, spherical, semi-spherical tower, pyramid and column-like.

6. The FVA structure liquid crystal display of claim 1 wherein the pixel electrode includes an indium tin oxide (ITO) layer.

7. The FVA structure liquid crystal display of claim 1 wherein the shape of the empty hole is selected from at least one of: circular, elliptical ring-shaped, square and rectangular.

8. The FVA structure liquid crystal display of claim 1 wherein the common electrode includes an ITO layer in the areas surrounding the empty hole.

9. The FVA structure liquid crystal display of claim 8 wherein the common electrode includes wall-bump protrusions on the ITO layer.

10. The FVA structure liquid crystal display of claim 1 wherein the liquid crystal materials have a positive ($\Delta\epsilon>0$) dielectric anisotropy.

11. The FVA structure liquid crystal display of claim 1 wherein the liquid crystal materials have a negative ($\Delta\epsilon<0$) dielectric anisotropy.

12. The method of making a wide view angle, fast response, high contrast ratio transmissive liquid crystal display (LCD) with a flower-shaped vertical alignment (FVA) comprising the steps of:
   (a) providing a first substrate with a protrusion shaped electrode as a pixel electrode;

(b) providing a second substrate with a common electrode in a parallel arrangement with the first substrate, the common electrode having an empty hole located directly above the entire pixel electrode leaving a gap spacing below the hole on each side of the pixel electrode between the pixel electrode and the common electrode;

(c) filling the space between the first and second substrates with a liquid crystal material;

(d) vertically aligning the liquid crystal layer;

(e) applying a voltage to the LCD common and pixel electrodes to generate an electric field distribution for vertical alignment that varies from the center of the pixel electrode toward each adjacent common electrode to form a flower blossom configuration in order to provide the LCD with the wide view angle, fast response, and high contrast ratio in a transmissive mode.

13. The method of claim 12 wherein the common electrode empty hole is a hexagon-shaped hole.

14. The method of claim 12 wherein at least one of the first and the second aligning layer is a polymer.

15. The method of claim 12 wherein at least one of the first and the second aligning layer is an inorganic material.

16. The method of claim 12 wherein the pixel electrode in the first substrate has a shape selected from at least one of: conic, spherical, semi-spherical tower, pyramid and column-like.

17. The method of claim 12 wherein the pixel electrode includes an indium tin oxide (ITO) layer.

18. The method of claim 12 wherein the shape of the empty hole is selected from at least one of: circular, elliptical ring-shaped, square and rectangular.

19. The method of claim 12 wherein the common electrode includes an indium tin oxide (ITO) layer.

20. The method of claim 19 wherein the common electrode includes wall-bump protrusions on the ITO layer.

21. The method of claim 12 wherein the liquid crystal materials have a positive ($\Delta\epsilon>0$) dielectric anisotropy.

22. The method of claim 12 wherein the liquid crystal materials have a negative ($\Delta\epsilon<0$) dielectric anisotropy.

23. The FVA structure liquid crystal display of claim 1 wherein the shape of the protrusion shaped pixel electrode is selected from a group consisting of a conical, spherical, semi-spherical tower, pyramid and column like structure.

* * * * *